(12) United States Patent
Hellerstein et al.

(10) Patent No.: US 9,152,458 B1
(45) Date of Patent: Oct. 6, 2015

(54) MIRRORED STATEFUL WORKERS

(75) Inventors: Joseph Hellerstein, Seattle, WA (US);
Rian T. Pirtle, Seattle, WA (US); Lamia Youseff, Seattle, WA (US)

(73) Assignee: Google Inc., Mountain View, CA (US)

( * ) Notice: Subject to any disclaimer, the term of this patent is extended or adjusted under 35 U.S.C. 154(b) by 323 days.

(21) Appl. No.: 13/599,861

(22) Filed: Aug. 30, 2012

(51) Int. Cl.
*G06F 9/46* (2006.01)
*G06F 9/48* (2006.01)

(52) U.S. Cl.
CPC ............ *G06F 9/4881* (2013.01); *G06F 9/4843* (2013.01)

(58) Field of Classification Search
None
See application file for complete search history.

(56) References Cited

U.S. PATENT DOCUMENTS

| | | | | |
|---|---|---|---|---|
| 6,041,384 | A * | 3/2000 | Waddington et al. | 710/200 |
| 6,363,496 | B1 * | 3/2002 | Kwiat | 714/4.5 |
| 6,587,436 | B1 * | 7/2003 | Vu et al. | 370/236.1 |
| 7,061,900 | B1 * | 6/2006 | Hsieh et al. | 370/351 |
| 7,526,549 | B2 * | 4/2009 | Block et al. | 709/225 |
| 7,865,037 | B1 * | 1/2011 | Bhaskar et al. | 382/282 |
| 8,346,682 | B2 * | 1/2013 | Steed et al. | 706/11 |
| 8,498,967 | B1 * | 7/2013 | Chatterjee et al. | 707/674 |
| 2002/0103793 | A1 * | 8/2002 | Koller et al. | 707/3 |
| 2003/0046220 | A1 * | 3/2003 | Kamiya | 705/37 |
| 2003/0088624 | A1 * | 5/2003 | Berkowitz et al. | 709/205 |
| 2003/0154115 | A1 * | 8/2003 | Lahey et al. | 705/8 |
| 2004/0073828 | A1 * | 4/2004 | Bronstein | 714/6 |
| 2005/0204184 | A1 * | 9/2005 | Endo | 714/4 |
| 2005/0222969 | A1 * | 10/2005 | Yip et al. | 707/1 |
| 2006/0085794 | A1 * | 4/2006 | Yokoyama | 718/100 |
| 2006/0221720 | A1 * | 10/2006 | Reuter | 365/189.05 |
| 2007/0124476 | A1 * | 5/2007 | Oesterreicher et al. | 709/226 |
| 2007/0239731 | A1 * | 10/2007 | Graf et al. | 707/10 |
| 2008/0077938 | A1 * | 3/2008 | Wajs | 719/313 |
| 2008/0195755 | A1 * | 8/2008 | Lu et al. | 709/241 |
| 2009/0157870 | A1 * | 6/2009 | Nakadai | 709/224 |
| 2009/0172669 | A1 * | 7/2009 | Bobak et al. | 718/100 |
| 2009/0245156 | A1 * | 10/2009 | Murakami et al. | 370/312 |
| 2010/0138687 | A1 * | 6/2010 | Noguchi et al. | 714/4 |

(Continued)

FOREIGN PATENT DOCUMENTS

WO    WO/0203256    7/2002

OTHER PUBLICATIONS

Wikipedia, "IPython", [online] [retrieved on May 21, 2013]. Retrieved from the Internet: <URL: http://en.wikipedia.org/wiki/IPython/>, 2 pages.

(Continued)

*Primary Examiner* — Emerson Puente
*Assistant Examiner* — Mehran Kamran
(74) *Attorney, Agent, or Firm* — Fish & Richardson P.C.

(57) ABSTRACT

Methods, systems, and apparatus, including computer programs encoded on computer storage media, for determining image search results. One of the methods includes scheduling a first computation for execution on each of a first plurality of worker processes. The first computation changes a respective state of each of one or more of the first worker processes from a first state to a second state. A respective second computation is scheduled for execution on each of a second plurality of worker, where each respective second computation will use a different value for a particular variable for two or more of the second plurality of worker processes. The respective state of each of the second plurality of worker processes is updated from the second state to a third state, where the third state corresponds to execution of the second computation using a first value of the particular variable.

17 Claims, 5 Drawing Sheets

(56) References Cited

U.S. PATENT DOCUMENTS

| | | | | |
|---|---|---|---|---|
| 2010/0199042 | A1* | 8/2010 | Bates et al. | 711/114 |
| 2010/0318605 | A1* | 12/2010 | Weis | 709/203 |
| 2011/0225463 | A1* | 9/2011 | Davis et al. | 714/47.3 |
| 2011/0276884 | A1* | 11/2011 | Marcjan et al. | 715/733 |
| 2012/0030685 | A1* | 2/2012 | Jackson | 718/104 |
| 2012/0284724 | A1* | 11/2012 | Alexander | 718/102 |
| 2013/0066661 | A1 | 3/2013 | Biebesheimer et al. | |
| 2013/0159760 | A1* | 6/2013 | Chen et al. | 713/401 |
| 2013/0173245 | A1* | 7/2013 | Vanspauwen | 703/21 |
| 2013/0191835 | A1* | 7/2013 | Araki | 718/102 |
| 2014/0096138 | A1* | 4/2014 | Dean et al. | 718/102 |
| 2014/0196055 | A1* | 7/2014 | Hu et al. | 718/105 |

OTHER PUBLICATIONS

Wikipedia, "Apache Hadoop", [online] [retrieved on May 21, 2013]. Retrieved from the Internet: <URL: http://en.wikipedia.org/wiki/Apache_Hadoop/>, 13 pages.

Wikipedia, "Dryad (programming)", [online] [retrieved on May 21, 2013]. Retrieved from the Internet: <URL: http://en.wikipedia.org/wiki/Dryad_(programming) />, 2 pages.

"Welcome to Apache Flume", [online] [retrieved on May 21, 2013]. Retrieved from the Internet: <URL: http:// flume.apache.org/>, 3 pages.

\* cited by examiner

MIRRORED STATEFUL WORKERS

BACKGROUND

This specification relates to parallel data processing.

Computing datacenters can host many thousands of machines, which can be used to break up large data processing workloads into smaller pieces, with each piece being processed by a different physical machine.

SUMMARY

A system can schedule computations on multiple mirrored, stateful worker processes. The worker processes are "stateful" because they have a defined computation state. The worker processes are "mirrored" because all worker processes have an identical computation state. The system can schedule state-altering and non-state-altering computations on the worker processes to leverage parallelism to solve exploratory analysis problems and to make them more interactive.

In general, one innovative aspect of the subject matter described in this specification can be embodied in methods that include the actions of scheduling a first computation for execution on each of a first plurality of worker processes, wherein each first worker process has a respective state that is the same as the state of all other worker processes; determining that each of one or more of the first worker processes executed the first computation and changed from a first state to a second state as a result of the first worker process having executed the first computation; scheduling a respective second computation for execution on each of a second plurality of worker processes that has a respective state that is the second state, wherein each respective second computation will use a different value for a particular variable for two or more of the second plurality of worker processes; after execution of the second computations, updating the respective state of each of the second plurality of worker processes from the second state to a third state, wherein the third state corresponds to execution of the second computation using a first value of the particular variable.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The respective state of a worker process is defined by a set of data to be used as input for a particular computation. The input to the first computation and the output of the first computation are the same for each of the first plurality of worker processes. The execution of the second computation on two or more of the second plurality of workers occurs simultaneously. The actions include determining that the first computation on a particular first worker process of the first plurality of worker processes did not modify a state of the first worker process from the first state to a second state that is the same as the state of all other worker processes; and removing the particular first worker process from a set of available worker processes. The actions include storing the respective state of a first worker process that has a respective state that is the second state; initializing a new worker process; updating the respective state of the new worker process to the second state, including causing the new worker process to read the stored state of the first worker process; and adding the new worker process to the second plurality of worker processes. The actions include reading the first state from storage; and updating the respective state of the first plurality of worker processes to the first state using the read first state. Determining whether execution of the first computation modified the state of one or more first worker processes from the first state to the second state comprises determining that the first computation occurred exactly once on each of the first plurality of worker processes.

Particular embodiments of the subject matter described in this specification can be implemented so as to realize one or more of the following advantages. Using mirrored, stateful workers accelerates iterative exploratory analysis by reducing response times. Stateful workers can also provide a way to share work between analysts by preserving state for important points in an analysis.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
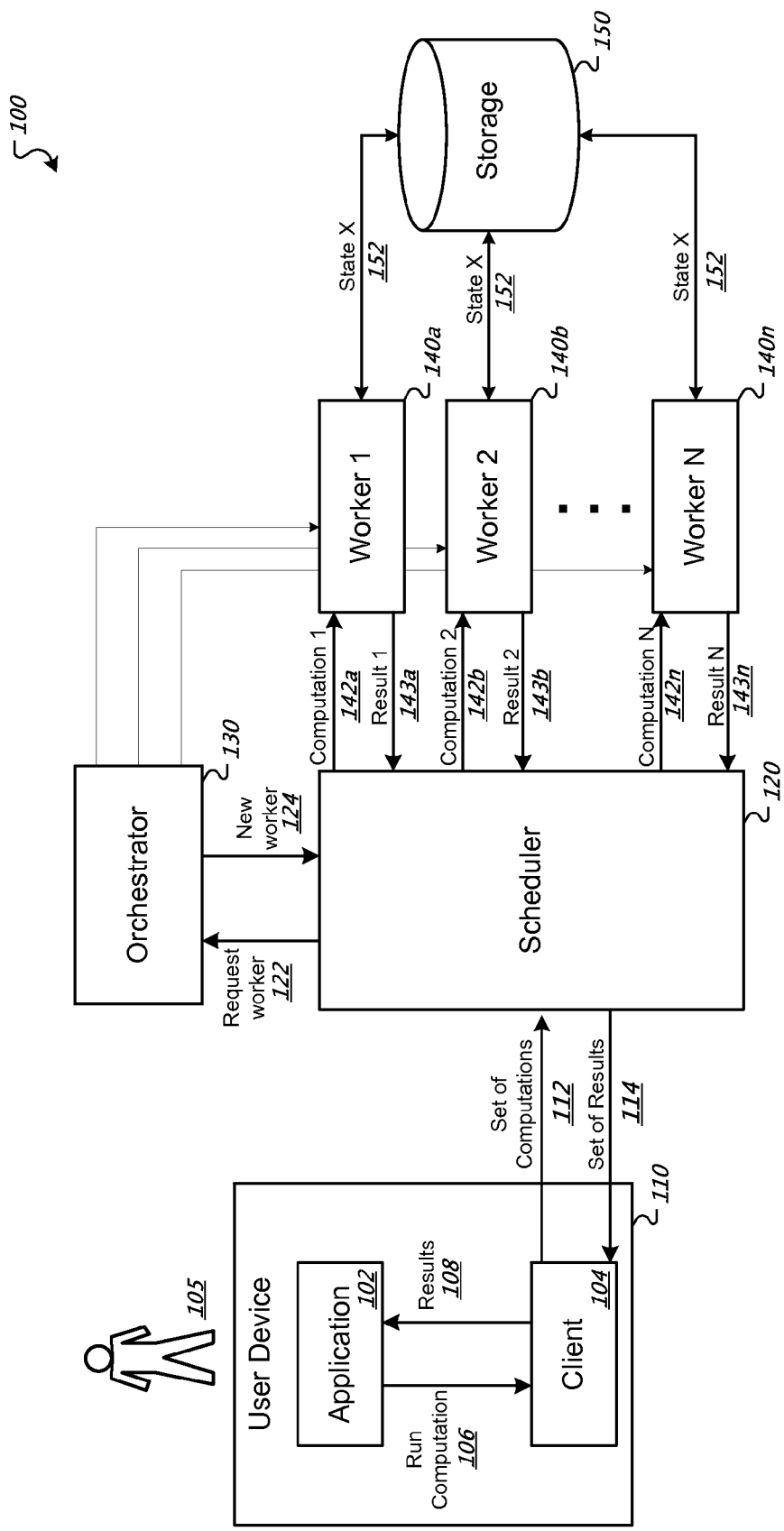
FIG. 1 is a diagram of an example system that implements mirrored, stateful workers.

FIG. 1 is a diagram of an example system 100 that implements mirrored, stateful workers. In general, a user 105 can use the system 100 to execute computations on multiple workers 140a-n.

To take advantage of parallelism, the multiple workers 140a-n are generally one or more computational processes that are each hosted by a different computing device. In some implementations, each worker has one or more dedicated computing devices.

In this specification, the workers 140a-n are referred to as "mirrored, stateful workers." The workers 140a-n are "stateful" workers because they have a well-defined computation state. The "computation state" of a particular worker process is defined by the set of data resident within the worker process and/or accessible to the worker process as input to perform a given computation. The computation state of a worker process is thus determined by in-memory objects of the process, persistent objects and files on disk or stored in other computer-readable storage, and installed software that is part of or available to the worker process for performing a particular computation. Two worker processes in the same state will produce the same output for a given computation.

The workers 140a-n are also referred to as "mirrored" stateful workers because the workers 140a-n have the same computational state. In some implementations, if a particular worker process ends up in a state that is different from the other worker processes, the system can remove the particular worker process from a pool of "mirrored, stateful worker processes" in order to maintain the "mirrored" attribute of the processes. The pool of workers can be allocated to a particular application program or user account present in the system 100. The system 100 may thus host and maintain multiple pools of workers, each for a particular application program or users account.

The system can perform the following types of computations on workers 140a-n: (1) computations that alter the state of the worker processes, and (2) computations that do not alter the state of the worker processes.

State-altering computations transition a worker process from a first computation state, N, to a second computation state, N+1. State-altering computations transition a worker process to a new state by altering the set of worker resident data that can be used for further computations.

Non-state-altering computations perform operations using the current state of a worker process and can also use a variety of other non-stateful input data provided in requests to the worker process. The non-state-altering computations return the result of the operations without altering the current state of the worker processes. In general, a user 105 can take advantage of the parallelism of the mirrored, stateful workers by providing different, non-stateful input data to each mirrored, stateful worker process and by analyzing the results of the different outputs. The user 105 can then select a particular output of the non-state-altering computation and use the particular output to alter the state of all the worker processes.

The system includes a user device 110, a scheduler 120, an orchestrator 130, workers 140a-n, and storage 150. The components of system 100 can be implemented as computer programs installed on one or more computers in one or more locations that are coupled to each other through a network. Each component can be a software-implemented input/output subsystem that provides an output that is different from the input. Each component can be an encoded block of functionality, such as a library, a platform, a Software Development Kit ("SDK"), or an object. The network coupling together the components of system 100 can include, for example, a wireless cellular network, a wireless local area network (WLAN) or Wi Fi network, a Third Generation (3G) or Fourth Generation (4G) mobile telecommunications network, a wired Ethernet network, a private network such as an intranet, a public network such as the Internet, or any appropriate combination thereof.

The user device 110, scheduler 120, orchestrator 130, and workers 140a-n can be implemented as computing systems using any appropriate type of computing device (e.g., servers, mobile phones, tablet computers, notebook computers, music players, e book readers, laptop or desktop computers, PDAs, smart phones, or other stationary or portable devices) that includes one or more processors and computer-readable media. Among other components, the user device 110, scheduler 120, orchestrator 130, and each of workers 140a-n can include one or more processors, computer readable media that store software applications, an input module (e.g., a keyboard or mouse), a communication interface, and a display device. The computing device or devices that implement the scheduler, orchestrator, and workers may include similar or different components.

Storage 150 can be implemented as a central data repository that is accessible over a network, or storage 150 can be implemented as a distributed storage system of multiple coordinating storage devices. Storage 150 can also be implemented as computer-readable storage local to computing devices hosting the workers 140a-n or other the components of the system 100.

The user 105 can either be a human or a computer program executing on a particular computing device and in communication with user device 110. The application program 102 and client 104 can be computer programs installed on user device 110 or running on different computing devices in communication with the user device 110. The user 105 uses user device 110 to specify through application program 102 a number of computations to be executed on worker processes 140a-n.

The execution of the computations specified by the user can be implemented by functionality of the client 104, for example, as part of an Application Programmer's Interface (API) between the application program 102 and the client 104. The client 104 receives a computation 106 from the application program 102 and provides a set of computations 112 to the scheduler 120. The client 104 receives a set of results 114 from the scheduler 120 when the set of computations are completed and provides the results 108 to the application program 102, where they can be analyzed by the user 105.

The scheduler 120 maintains a pool of mirrored, stateful workers 140a-n. The scheduler 120 assigns computations to workers. In addition, the scheduler 120 keeps track of the computation state of each worker 140a-n and ensures that the pool of workers remains a pool of mirrored, stateful workers. The scheduler 120 can remove from the pool workers that have failed, timed out, or are unresponsive. The scheduler 120 can also request 122 allocation of new workers from orchestrator 130, and can update or modify the state of a particular worker. For example, if the number of workers in a particular pool of workers decreases below an appropriate size, the scheduler 120 can request more workers from the orchestrator 130.

The orchestrator 130 allocates and provisions new workers. For example, the orchestrator 130 can identify a particular new computing device, e.g. by selecting a computing device from among computing devices in a datacenter. The orchestrator 130 can initiate a new worker process on the new computing device, and provide authentication data to the new worker process for communicating with the scheduler 120. The orchestrator 130 can then provide data identifying the new worker 124 to the scheduler 120. If the number of available resources in the system decreases or is insufficient to meet the demand for worker processes, the orchestrator can indicate, for example to a user or an application program, that the system is unavailable for new requests or for new users.

The workers 140a-n receive computations 142a-n from the scheduler 120. The workers 140a-n execute the computations 142a-n, which may alter the computation state of the workers 140a-n. The workers 140a-n in response provide results 143a-n back to the scheduler 120 after executing the computations 142a-n. The workers 140a-n can read and write computation state 152 to storage 150, which can be stored as a "checkpoint." The checkpoint can include information that is sufficient to recover a previous state of a particular worker process, including stateful input data, e.g. in-memory objects and files on disk. The scheduler 120 can save the computation state of a particular worker by serializing and writing the computation state 152 of a particular worker to storage 150, or by directing the particular worker process to do so. The computation state of workers 140a-n can be serialized by converting the stateful input data, e.g. in-memory objects and files on disk, into a format that can be stored in storage 150. The computation state of workers 140a-n can be deserialized by reading the serialized data from storage 150 and initializing the objects and files of the stateful input data.

Figure 2:
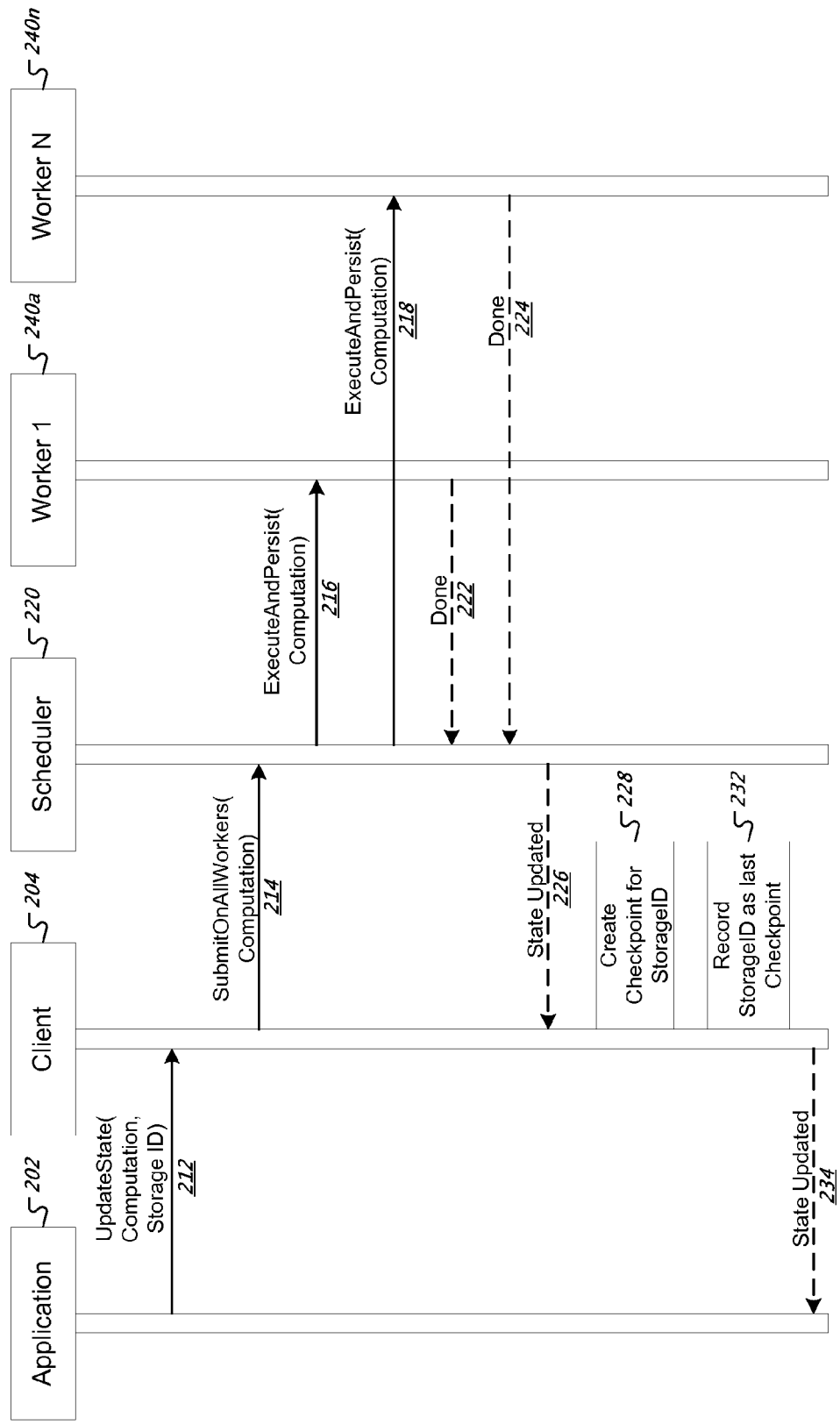
FIG. 2 is a sequence diagram performing a state-altering computation.

FIG. 2 is a sequence diagram of performing a state-altering computation. In general, the scheduler 220 schedules a computation that changes the computation state of each of a pool of mirrored, stateful worker processes, and the scheduler 220 ensures that all of the worker processes transition to the new state.

The application program 202 submits a request to update the state, "UpdateState," to the client 204 (212). The request specifies a set of computations to execute and a storage identifier of a particular state to be saved in storage. The storage identifier can be used to save or load the state of the mirrored, stateful workers.

The client 204 submits a request, "SubmitOnAllWorkers," to execute the provided computation exactly once on each worker (214). Executing the computation exactly once on all workers can ensure that all workers remain in the same state at the end of the computation. If the scheduler 220 determines that a particular worker did not execute the computation exactly once, e.g. zero or two times, the scheduler 220 can remove the worker from the pool of mirrored, stateful workers. Alternatively, the scheduler 220 can load and reset the previous state of a worker to the previous computation state and attempt the computation on the worker again.

The scheduler submits a command, "ExecuteAndPersist," that specifies a computation to Worker 1 240a (216). The "ExecuteAndPersist" command is intended to produce an identical result on all workers that are in the same state. Similarly, the scheduler 220 also submits an "ExecuteAndPersist" command to Worker N 240n (218). Although only two workers are shown in FIG. 2, the scheduler 220 can schedule computations on more than two workers as well. The scheduler 220 can submit respective computations on the worker processes such that at least some of the operations of the computations happen simultaneously, that is, in parallel. In other words, the scheduler 220 need not wait for one computation to complete before submitting computations on other worker processes.

Worker 1 240a notifies the scheduler 220 that its computation is complete (222), and Worker N 240n also notifies the scheduler that its computation is complete (224). The scheduler 220 notifies the client that all workers have performed the computation and have transitioned to the new state (226).

After transitioning to the new state, the client 204 can create and store a "checkpoint," which can allow a user to later return to this state of the process (228). Creating the checkpoint can include writing the current state of one or more worker processes to storage using the provided storage ID (228). The client 204 also records the provided storage ID as the last checkpoint in the process (232). The client 204 then notifies the application program 202 that the state has been updated successfully (234).

An example computation for changing the state of the workers is having each worker read a set of data into memory. For example, for a financial analysis task, the computation can require that all workers read a dataset of stock price data into memory. The workers can each read the stock price data into memory, thereby transitioning from a first state to a second state in which the stock price data is loaded into memory. After the workers have transitioned to the new state, the scheduler 220 can issue a second command to operate on the stock price data loaded into memory, thereby further transitioning the state of the workers to a third state. For example, the scheduler could instruct the workers to perform a k-means clustering algorithm on the stock price data. The results of the k-means clustering algorithm can, for example, remain in memory on all mirrored, stateful workers in the pool in the third state.

Figure 3:
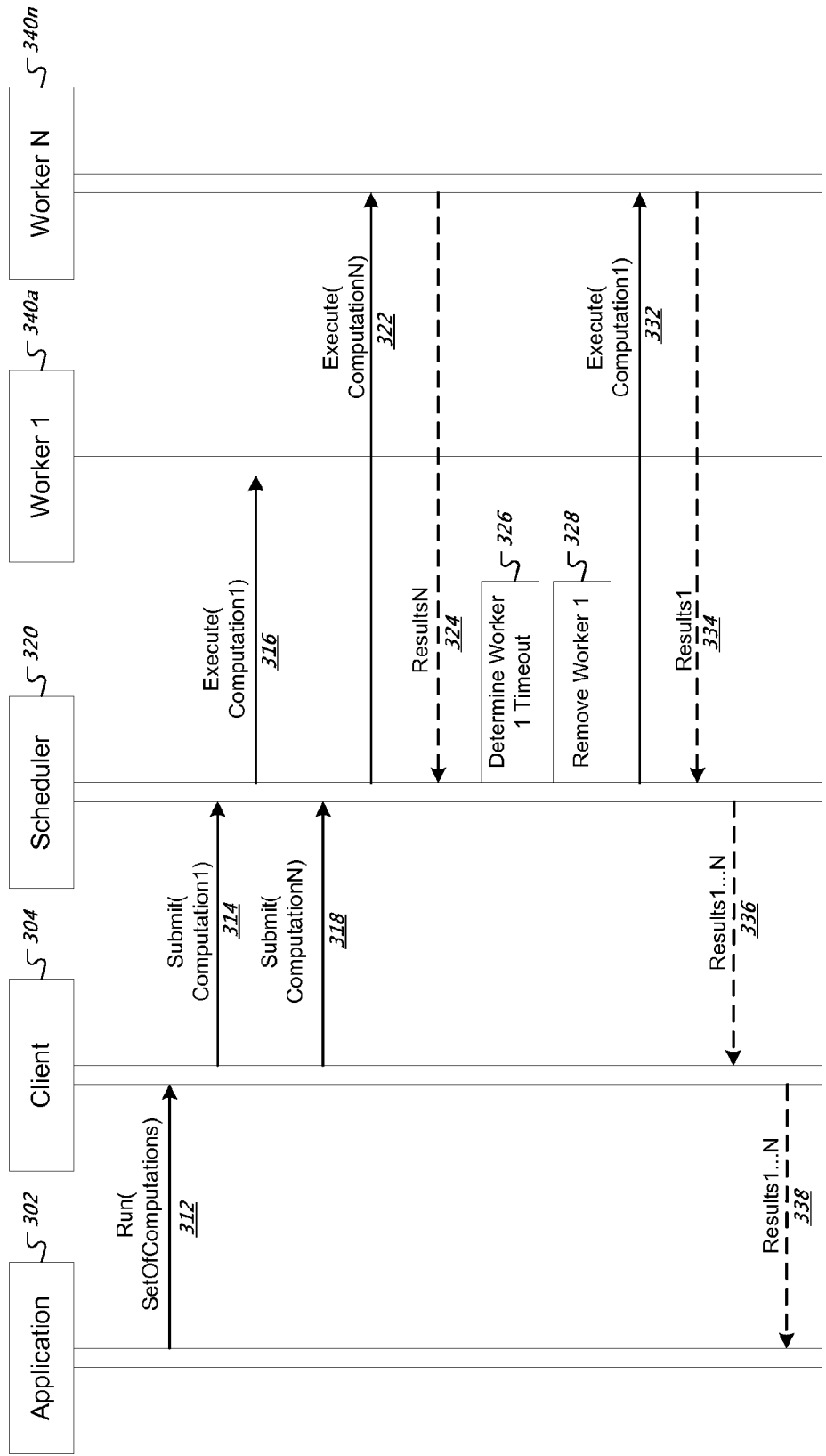
FIG. 3 is a sequence diagram of scheduling a non-state-altering computation.

FIG. 3 is a sequence diagram of scheduling a non-state-altering computation. In general, the scheduler 320 schedules a different variation of the same computation on each of the mirrored, stateful workers and collects the results of all the different computation variations. The scheduler 320 can, for example, provide a different non-stateful variable to each of the mirrored, stateful workers and collect the results from each worker. The results of the different computations can then be analyzed by a user, for example.

The application program 302 submits a request to the client to run a set of computations (312). The client 304 can iteratively submit the different computations to the scheduler (314, 318), wherein each computation can specify one or more different non-stateful variables. The scheduler 320 schedules a first computation on Worker 1 340a (316) and another computation on Worker N 340n (322). The scheduler 320 can submit the computations such that at least some of the computations are performed by the worker processes 340a-n in parallel or simultaneously.

The scheduler 320 can ensure that all the computations are executed before returning a set of results. If any of the workers fail to return a result, the scheduler can choose a different worker on which to run the computation. For non-state-altering computations, the scheduler can choose an arbitrary worker from among the pool of mirrored, stateful workers to run the computation because all workers in the pool have the same state.

The scheduler receives the computation results from Worker N 340n (324). However, the scheduler then determines that Worker 1 340a has failed (326). The scheduler can determine that a worker has failed either by using a timeout of a predetermined time period, or by actively using a "heartbeat" to determine whether the worker is still responding. In response to determining that the worker has failed, the scheduler can remove Worker 1 340a from the pool of mirrored, stateful workers (328).

The scheduler 320 schedules Computation 1 from the failed worker process on Worker N 340n (332). Because the computation is a non-state-altering computation, the scheduler 320 can schedule the computation on any mirrored, stateful worker and any mirrored, stateful worker can perform more than one of the non-state-altering computations and return the results of each computation.

The scheduler receives the computation results from Worker N 340n (334). The scheduler 320 then returns the set of results to the client 304 (336), and the client 304 returns the set of results to the application program 302 (338).

Continuing the financial analysis example from above with reference to FIG. 2, a user may determine that the results of the k-means clustering algorithm are unsatisfactory. The user may then decide to filter the input data to remove outliers, but may be unsure of how to define the outliers or how the outliers may affect the quality of the clustering. Therefore, the user can take advantage of the parallelism of the mirrored, stateful workers by defining different outlier values (e.g. the extreme 1%, 0.5%, 0.01%) and running a filtering computation using a different outlier value on each of the mirrored stateful workers. The user can then rerun the k-means clustering on each of the workers using each of the different outlier values to determine which outlier value resulted in the most favorable clustering results.

After determining the particular outlier value that resulted in the most favorable clustering results, the user can schedule a state-altering computation that updates the state of all workers using the particular selected outlier value. In this way, the mirrored, stateful workers accelerate and provide an interactive environment for iterative exploratory analysis.

Figure 4:
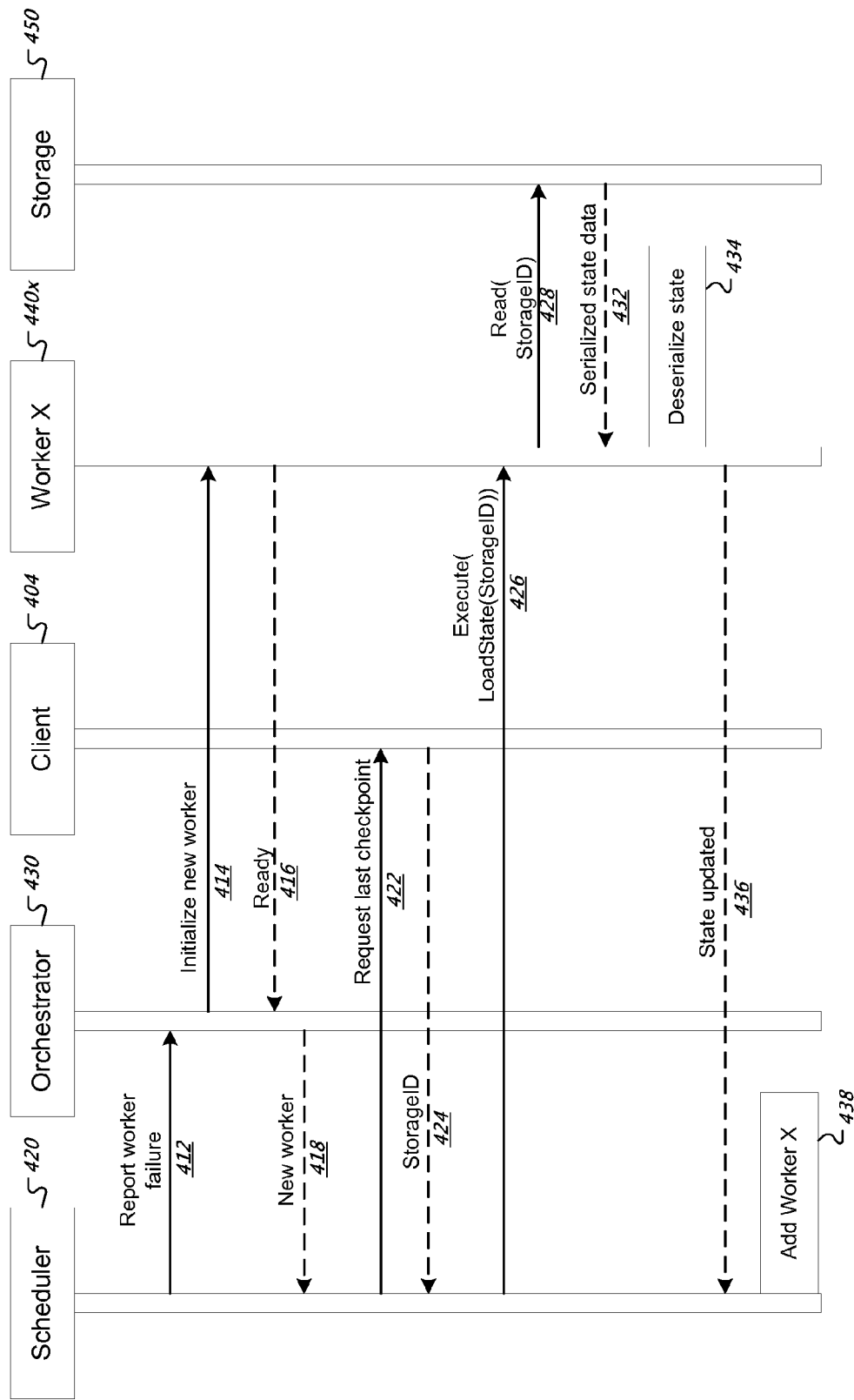
FIG. 4 is a sequence diagram of initiating a new worker process in a particular state.

FIG. 4 is a sequence diagram of initiating a new worker process in a particular state. In general, the orchestrator 430 will allocate a new worker process on a particular computing device and provide information identifying the new worker process to the scheduler 420.

The scheduler 420 reports a worker failure to the orchestrator 430 (412). In response, the orchestrator initializes a new worker process 440x (414). To initialize the new worker process, the orchestrator 430 can identify a particular computing device to host the worker process. For example, the orchestrator can select a particular computing device from among multiple computing devices in a datacenter. The computing devices can be either physical machines or virtual machines. After selecting a particular computing device, the orchestrator can initialize the worker process 440x on the computing device (414). After being initialized, the new worker process 440x provides a ready message to the orchestrator 430 (416).

The orchestrator 430 provides information identifying the new worker process to the scheduler 420 (418). For example, the orchestrator 430 can provide a name or a network address of the computing device that is hosting the worker process 440x. After receiving identifying information about the new worker process, the scheduler 420 can update the state of the new worker process and add the new worker process to the pool of mirrored, stateful workers.

The scheduler 420 requests the last checkpoint from the client 404 (422). In response, the client 404 returns the storage ID of the last checkpoint (424). The scheduler 420 can use the storage ID of the last checkpoint to update the state of the new worker process.

The scheduler issues an "Execute" command to the new worker process instructing the working process to load the state identified by the storage ID (426). The worker process 440x requests the serialized state data from storage 450 (428), and storage 450 provides the serialized state data in response to the request (432).

The worker process 440x deserializes the serialized state data (434). Deserializing the state data can include initializing objects in memory, persistent objects and files on disk, and installing required software or other programs of the serialized state data.

The worker process 440x notifies the scheduler 420 that its state has been updated (436). After updating its state, the worker process 440x will be in the same state as all other worker processes in the pool of mirrored, stateful workers. The scheduler 420 therefore adds the worker process 440x to the pool (438).

Figure 5:
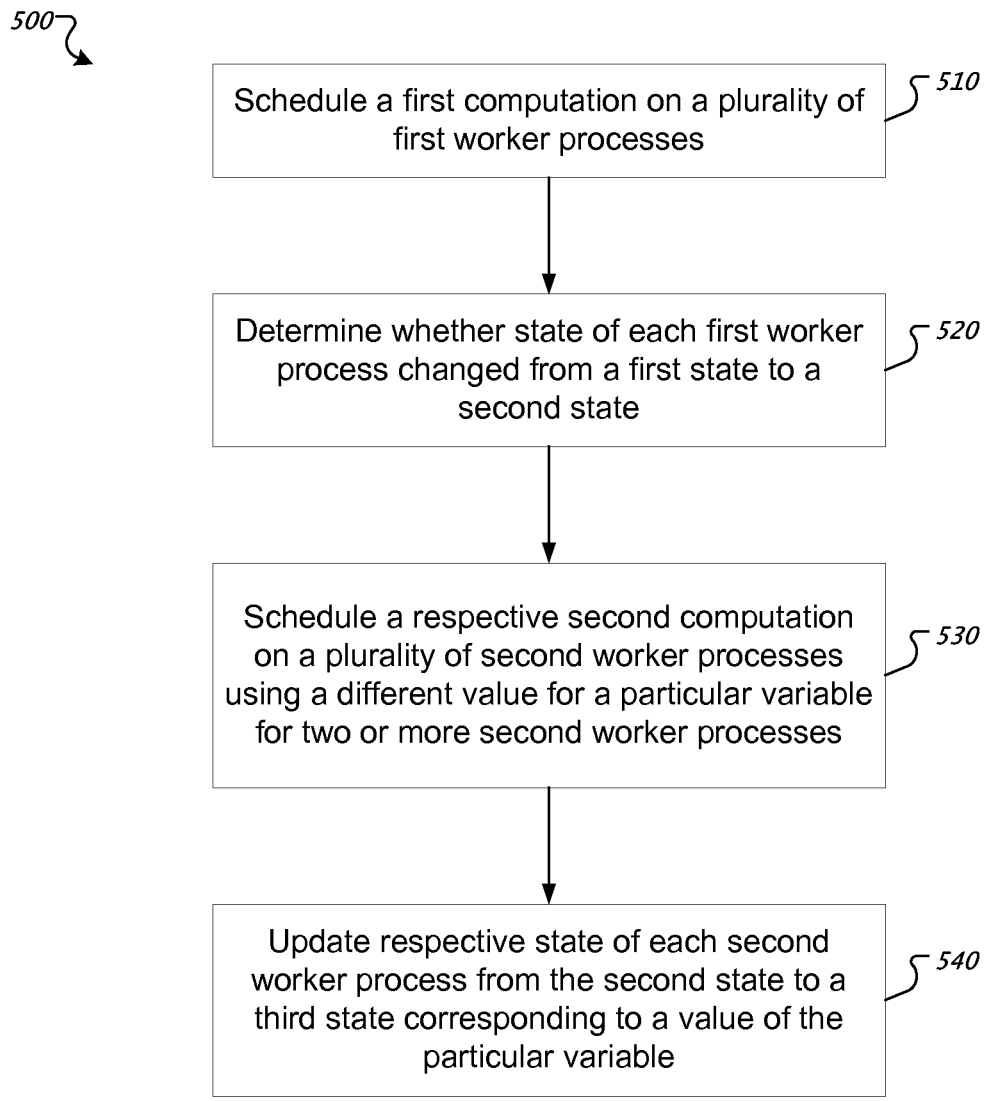
FIG. 5 is a flow chart of an example process for scheduling computations on mirrored, stateful workers.

FIG. 5 is a flow chart of an example process 500 for scheduling computations on mirrored, stateful workers. In general, the process 500 includes a state-altering computation and a non-state-altering computation to be performed by a pool of mirrored, stateful worker processes, as described above.

The process 500 can be performed by a scheduler, e.g. the scheduler 120 as shown in FIG. 1. For convenience, the process 500 will be described as being performed by an appropriately programmed system of one or more computers.

The system schedules a first computation on a plurality of first worker processes (510). The first computation can be a state-altering computation that modifies the state of each worker process equivalently. The worker processes in the plurality of first worker processes can be mirrored, stateful workers that all have the same computation state.

The system determines whether a state of each first worker process changed from a first state to a second state (520). The system can determine whether each worker process changed to a second state by determining that the computation executed exactly once on each of the plurality of worker processes. For example, the system can determine whether each of the first worker process read stock price information and performed k-means clustering on the stock price information to arrive at the second state.

If the state of each first worker process changed to the second state, the system can proceed with further steps in the process. If the state of any particular worker process did not transition to the second state, either due to a timeout, worker failure, or some other error, the system can remove the worker process from the pool of mirrored, stateful workers. The system can then initialize a new worker process, update the process's state to the second state, and add the new worker process to the pool of mirrored, stateful workers.

The system can also save the current computation state by serializing the stateful input data and storing the serialized data in storage, as described above. The system can later read the serialized data to restore or update the computation state of a particular worker process.

The system schedules a respective second computation on a plurality of second worker processes using a different value for a particular variable for two or more of the second worker processes (530). The second computation can be an exploratory, non-state-altering computation. For example, the system can provide a different outlier value to each of the second worker processes for filtering stock prices, as described above. After performing operations of the second computation, each of the second worker processes can return the respective results of the second computation, e.g. a k-means clustering analysis using each outlier value. A user or a computer program can then analyze the respective results from the second computation and select a value for the particular variable used for the second computation. For example, a user could select an outlier value of 1%.

The system updates the respective state of each second worker process from the second state to a third state corresponding to the selected value of the particular variable (540). The system can perform a state-altering computation on each of the second worker processes. The computation can be a version of the second computation that uses the selected value of the variable. For example, the system can perform the second computation on all workers using the selected outlier value of 1%. As with other state-altering computations, the system can determine whether any worker processes failed to reach the third computation state and remove such worker processes from the pool of mirrored, stateful workers.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   obtaining a plurality of different parameter values for a first computation, each parameter value being a different candidate value for transitioning all worker processes in a pool of worker processes from having a first state to having a different second state, wherein the worker processes in the pool of worker processes are installed on a plurality of different respective computing devices, wherein each worker process in the pool of worker processes has a state that is the same as the state of all other worker processes in the pool of worker processes;
   providing each worker process having the first state a different respective parameter value that is different from parameter values provided to all other worker processes having the first state, wherein each worker process having the first state performs the first computation including applying the respective parameter value to generate a respective first result for the first computation according to the respective parameter value, and wherein the first computation is a non-state-altering computation;
   receiving respective first results of the first computation from one or more worker processes of the pool of worker processes that performed the first computation;
   receiving user input from a user selecting, as a selected parameter value, a parameter value of the plurality of parameter values based on the respective first results of the first computation; and
   providing each worker process in the pool of worker processes having the first state the selected parameter value, wherein each worker process receiving the selected parameter value performs a second computation including applying the selected parameter value to modify the state of the worker process from having the first state to having the second state corresponding to the selected parameter value, and wherein the second computation is a state-altering computation.

2. The method of claim 1, wherein the respective state of a worker process is defined by a set of data to be used as input for a particular computation.

3. The method of claim 2, wherein input to the second computation and output of the second computation are the same for each of the worker processes in the pool of worker processes.

4. The method of claim 1, wherein two or more worker processes of the pool of worker processes perform the first computation simultaneously.

5. The method of claim 1, further comprising:
   determining that a first worker process did not successfully modify a state of the first worker process from the first state to the second state; and
   in response to the determining, removing the first worker process from the pool of worker processes.

6. The method of claim 1, further comprising:
   storing the respective state of a first worker process that has a respective state that is the second state;
   initializing a new worker process;
   updating the respective state of the new worker process to the second state, including causing the new worker process to read the stored state of the first worker process; and
   adding the new worker process to the pool of worker processes.

7. The method of claim 1, further comprising:
   reading the first state from storage; and
   updating the respective state of each worker process in the pool of worker processes to the first state using the first state read from storage.

8. A system comprising:
   one or more computers and one or more storage devices storing instructions that are operable, when executed by the one or more computers, to cause the one or more computers to perform operations comprising:
   obtaining a plurality of different parameter values for a first computation, each parameter value being a different candidate value for transitioning all worker processes in a pool of worker processes from having a first state to having a different second state, wherein the worker processes in the in a pool of worker processes are installed on a plurality of different respective computing devices, wherein each worker process in the pool of worker processes has a state that is the same as the state of all other worker processes in the pool of worker processes;
   providing each worker process having the first state a different respective parameter value that is different from parameter values provided to all other worker processes having the first state, wherein each worker process having the first state performs the first computation including applying the respective parameter value to generate a respective first result for the first computation according to the respective parameter value, and wherein the first computation is a non-state-altering computation;
   receiving respective first results of the first computation from one or more worker processes of the pool of worker processes that performed the first computation;

receiving user input from a user selecting, as a selected parameter value, a parameter value of the plurality of parameter values based on the respective first results of the first computation; and providing each worker process in the pool of worker processes having the first state the selected parameter value, wherein each worker process receiving the selected parameter value performs a second computation including applying the selected parameter value to modify the state of the worker process from having the first state to having the second state corresponding to the selected parameter value, and wherein the second computation is a state-altering computation.

9. The system of claim 8, wherein the respective state of a worker process is defined by a set of data to be used as input for a particular computation.

10. The system of claim 9, wherein input to the second computation and output of the second computation are the same for each of the worker processes in the pool of worker processes.

11. The system of claim 8, wherein two or more worker processes of the pool of worker processes perform the first computation simultaneously.

12. The system of claim 8, wherein the operations further comprise:

determining that a first worker process did not successfully modify a state of the first worker process from the first state to the second state; and in response to the determining, removing the first worker process from the pool of worker processes.

13. The system of claim 8, wherein the operations further comprise:

storing the respective state of a first worker process that has a respective state that is the second state;

initializing a new worker process;

updating the respective state of the new worker process to the second state, including causing the new worker process to read the stored state of the first worker process; and adding the new worker process to the pool of worker processes.

14. The system of claim 8, wherein the operations further comprise:

reading the first state from storage; and updating the respective state of each worker process in the pool of worker processes to the first state using the first state read from storage.

15. A non-transitory computer-readable medium storing software comprising instructions executable by one or more computers which, upon such execution, cause the one or more computers to perform operations comprising:

obtaining a plurality of different parameter values for a first computation, each parameter value being a different candidate value for transitioning all working processes in a pool of worker processes from having a first state to having a different second state, wherein the worker processes in the pool of worker processes are installed on a plurality of different respective computing devices, wherein each worker process in the pool of worker processes has a state that is the same as the state of all other worker processes in the pool of worker processes;

providing each worker process having the first state a different respective parameter value that is different from parameter values provided to all other worker processes having the first state, wherein each worker process having the first state performs the first computation including applying the respective parameter value to generate a respective first result for the first computation according to the respective parameter value, and wherein the first computation is a non-state-altering computation;

receiving respective first results of the first computation from one or more worker processes of the pool of worker processes that performed the first computation;

receiving user input from a user selecting, as a selected parameter value, a parameter value of the plurality of parameter values based on the respective first results of the first computation; and providing each worker process in the pool of worker processes having the first state the selected parameter value, wherein each worker process receiving the selected parameter value performs a second computation including applying the selected parameter value to modify the state of the worker process from having the first state to having the second state corresponding to the selected parameter value, and wherein the second computation is a state-altering computation.

16. The computer-readable medium of claim 15, wherein the operations further comprise:

determining that a first worker process did not successfully modify a state of the first worker process from the first state to the second state; and in response to the determining, removing the first worker process from the pool of worker processes.

17. The computer-readable medium of claim 15, wherein the operations further comprise:

storing the respective state of a first worker process that has a respective state that is the second state;

initializing a new worker process;

updating the respective state of the new worker process to the second state, including causing the new worker process to read the stored state of the first worker process; and adding the new worker process to the pool of worker processes.

* * * * *